No. 639,010. Patented Dec. 12, 1899.
F. W. BARTHELS.
COLLAR FOR PIPES OR TUBES.
(Application filed June 26, 1899.)
(No Model.)
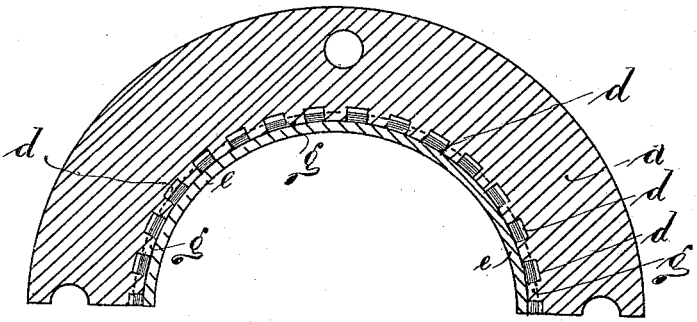
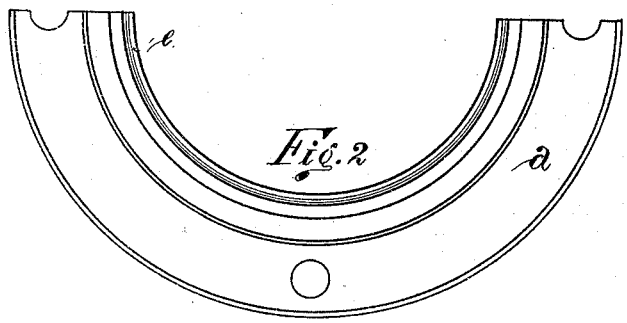
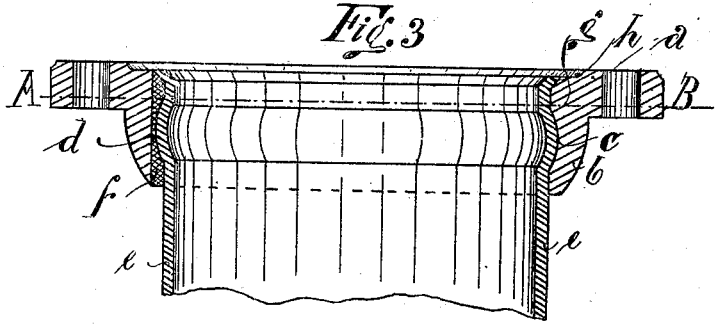
Witnesses:
G. S. Noble
J. J. Heller
Inventor,
Friedrich Wilhelm Barthels
by B. Singer,
Att'y.

UNITED STATES PATENT OFFICE.

FRIEDRICH WILHELM BARTHELS, OF HAMBURG, GERMANY.

COLLAR FOR PIPES OR TUBES.

SPECIFICATION forming part of Letters Patent No. 639,010, dated December 12, 1899.

Application filed June 26, 1899. Serial No. 721,952. (No model.)

*To all whom it may concern:*

Be it known that I, FRIEDRICH WILHELM BARTHELS, a subject of the German Emperor, residing at Hamburg, in the German Empire, have invented new and useful Improvements in Collars for Pipes or Tubes, (for which I made application for patent in Germany June 5, 1899, German Design Patent June 5, 1899, and application for patent in Great Britain June 7, 1899,) of which the following is a specification.

Hitherto the method adopted for securing flanges or collars to tubes consists in introducing the tube into the opening of the annular flange and then applying clay to the rear of the flange to hold a sufficient amount of solder. By means of heat the solder is melted to connect the tube with its flange. Great care has to be taken that the molten-solder does not melt away the metal of either the flange or tube or cause a gutter to be formed through which the metal runs off, with the result that the pipe is damaged.

My invention obviates the weakening of the tube, yet the connection between it and the flange or collar is a more secure one.

In order that the invention may be understood and readily carried into practice, I will describe the same with reference to the accompanying drawings, in which—

Figure 1 is a section taken on the line A B of Fig. 3. Fig. 2 is a part plan of a tube and flange. Fig. 3 is a longitudinal section of the same, showing the connection of the parts.

The collar $a$ is formed with a flange $b$, in the under side of which is formed an annular groove $c$ and a number of longitudinal grooves $d$, extending at right angles through said annular groove. The tube $e$ is introduced into the flange and spun or hammered into the annular groove $c$, thereby securing it to some extent. Clay is then applied to the rear of the flange, and the grooves $d$ are filled with hard solder $f$, and the flange, with the solder therein, is heated from the front. The grooves are so distributed as to leave enough material in the form of projections $g$ in the flange to prevent the molten solder from damaging them. Thus the tube is firmly secured by being first hammered or spun into the annular groove $c$ and then by brazing the solder in the grooves forming intervals in regular order through the said annular groove.

If desired, a second groove $h$ may be provided for the purpose of receiving the edge of the tube, as shown.

What I claim as my invention, and desire to secure by Letters Patent, is—

A collar for pipes, having a flange with an annular groove on the under side of same, and with a plurality of longitudinal grooves extending through said collar and flange intersecting said annular groove, substantially as set forth.

In testimony whereof I affix my signature in presence of two witnesses.

FRIEDRICH WILHELM BARTHELS.

Witnesses:
E. H. L. MUMMENHOFF,
HUGH PITCAIRN.